June 25, 1963 R. G. GOEKLER ETAL 3,095,501
FULL FLOATING WELDING HEAD CARRIAGE FOR WELDING CYLINDRICAL
OBJECTS OF RELATIVELY LARGE DIAMETER
Filed April 10, 1961 3 Sheets-Sheet 1

INVENTORS.
Robert G. Goekler
BY William B. Handwerk

ATTORNEYS.

INVENTOR.
Robert G. Goekler
William B. Handwerk
BY
ATTORNEYS.

June 25, 1963 R. G. GOEKLER ETAL 3,095,501
FULL FLOATING WELDING HEAD CARRIAGE FOR WELDING CYLINDRICAL
OBJECTS OF RELATIVELY LARGE DIAMETER
Filed April 10, 1961 3 Sheets-Sheet 3

INVENTORS.
Robert G. Goekler
BY William B. Handwerk

Hovey, Schmidt, Johnson & Hovey
ATTORNEYS.

United States Patent Office 3,095,501
Patented June 25, 1963

3,095,501
FULL FLOATING WELDING HEAD CARRIAGE FOR WELDING CYLINDRICAL OBJECTS OF RELATIVELY LARGE DIAMETER
Robert G. Goekler and William B. Handwerk, Tulsa, Okla., assignors to Crose-Perrault Equipment Corporation, Tulsa, Okla., a corporation of Oklahoma
Filed Apr. 10, 1961, Ser. No. 101,968
14 Claims. (Cl. 219—124)

The present invention relates to welding equipment and more particularly, to welding apparatus for joining large diameter pipe sections to be used in a pipeline.

In field assembling a pipeline a great deal of time, and therefore, cost of constructing the pipeline, is involved in an operator seam welding successive sections of pipe as the line is assembled. While pipe is constructed in standard lengths for shipment to the field, it has been found that two or more sections of pipe can be preseamed and subsequently handled as a single section in the assembly process. Preseaming of sections of pipe in this manner can be done with an automatic welding apparatus, reducing field welding time by one-half or more.

It should be understood that while the preferred embodiment illustrated is a machine for welding the exterior seams of pipe sections, the machine is capable of welding other cylindrical objects of relatively large diameter and the present invention should not be deemed limited to the preferred embodiment or application illustrated.

The apparatus of the present invention is particularly useful with an external welding rack of the type described in copending application Serial No. 755,666, filed August 18, 1958, by Handwerk and Sherrill, and can be mounted thereon for use in the field.

The present invention proposes to provide welding apparatus including a welding carriage which is sling-mounted to a boom to be raised and lowered. In this manner, the entire carriage can be dropped into supported engagement with the piece to be welded and lifted off again as desired. The carriage is provided with means interconnecting the carriage and the boom floating the carriage relative to the workpiece as required to compensate for irregularities in the conformation thereof. The carriage is also provided with a series of adjustments selectively positioning a welding head connected to the carriage through the adjusting mechanism.

It is, therefore, the most important object of this invention to provide a welding carriage adapted for floating support relative to the generally arcuate surface of a pipe or the like to be welded, so as to compensate for irregularities in such surface and maintain the relationship between a welding electrode mounted on the carriage and the surface being welded substantially constant.

It is another important object of the invention to provide such a welding carriage in which the head carrying the welding electrode is shiftably mounted on the carriage and there are provided various adjustments by which the relationship between the welding electrode and the surface to be welded can be fully controlled.

Still other objects of the invention will be made clear or become apparent as the following description of a preferred embodiment progresses.

Figure 1:
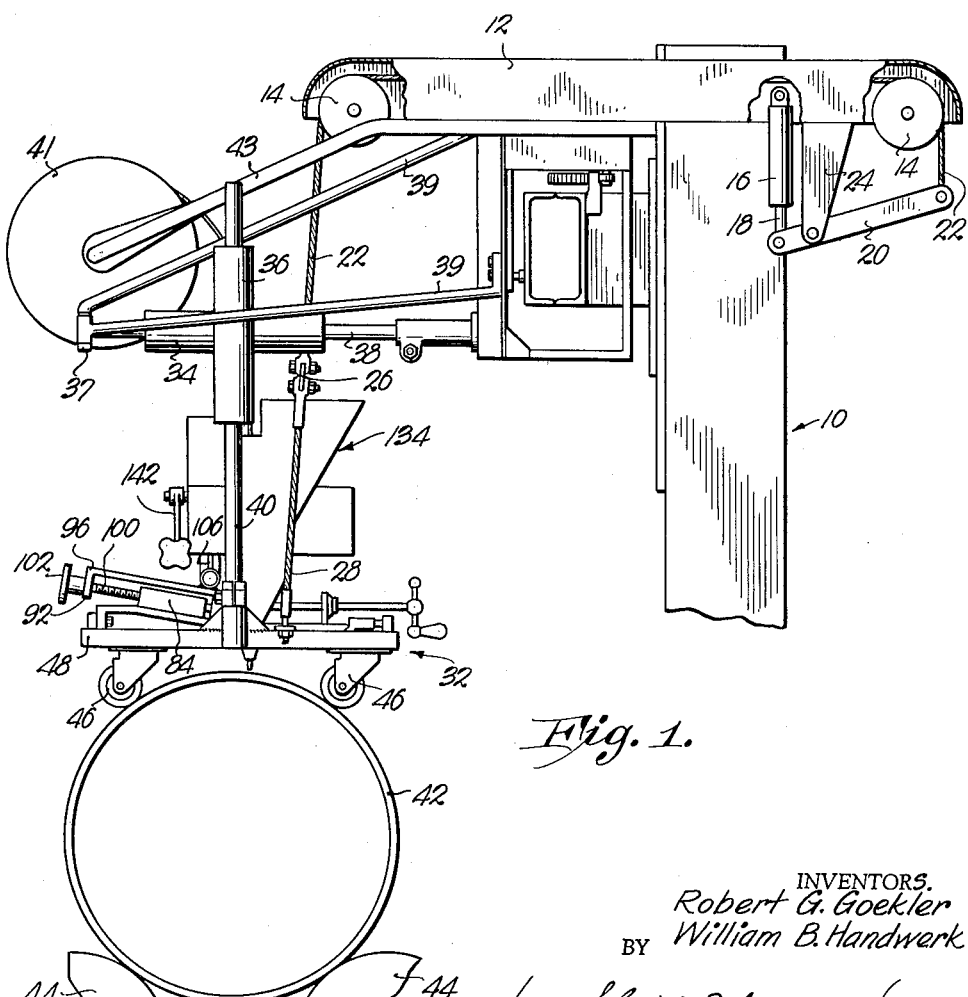
FIG. 1 is a side elevational view of a machine embodying the present invention.

Referring now to the drawings, and particularly to FIG. 1, there is shown an upright support indicated generally by the numeral 10. A cross member 12 is supported from upright 10 and forms a hood over a pair of pulleys 14 rotatably mounted therein. A hydraulic ram 16 is fixed to the cross member 12 at one end and extends downwardly therefrom. The piston 18 of ram 16 is connected to one end of a link 20. The other end of link 20 is attached to a cable 22 and the link is pivoted intermediate its ends to a bracket 24 extending downwardly from the cross member 12.

The end of cable 22 remote from link 20 carries a yoke 26 which in turn supports a pair of cables 28 and 30 attached to a welding carriage indicated generally by the number 32. The structure thus far described is adapted to raise and lower the welding carriage off of and onto a workpiece to be welded in a manner which will be described as this specification proceeds.

Means are supplied to floatingly support the welding carriage 32 in a vertical plane and in a horizontal plane transverse to the workpiece. The means are illustrated in FIG. 1 in the form of a pair of cylindrically shaped sleeve bearings 34 and 36 which are fixed together for example, by welding with the bearings disposed at right angles to each other. A first bearing shaft 38 extends outwardly from the cross member 12 transverse to the workpiece and a second bearing shaft 40 extends vertically upward from the carriage 32 at right angles to the first shaft 38. The carriage 32 is oriented with respect to the cross member 12 such that the first bearing shaft 38 is received in sleeve bearing 34 and the second shaft is received in sleeve 36. First shaft 38 is supported adjacent its extended end by a ring bearing 37 supported by a plurality of struts 39 from the upright 10 and hood 12. Wire feed spool 41 is rotatably supported by struts 43 which are in turn fixed on hood 12.

The workpiece may comprise a cylindrical pipe such as 42 shown in FIG. 1 which is rotatably supported upon a pair of rollers 44 provided for this purpose. Welding carriage 32 has a plurality of casters 46 extending downwardly therefrom. Casters 46 ride upon the surface of the pipe 42 and support the carriage 32 while it is in position for the welding operation. Bolts 47 are provided to fasten casters 46 to the carriage 32 and also act to prevent casters 46 from undesired swivel movement.

Carriage 32 is comprised primarily of a rectangular channel frame 48 having a fixed axle 50 extending across its width. Axle 50 is parallel to the ends of frame 48. Longitudinal adjustment means are provided on carriage 32 including a cylindrical bearing 52 axially slidably mounted for movement along axle 50 and which carries a pair of brackets 54 and 56.

Bracket 54 extends to the end of carriage 32 closest to upright member 10 and rotatably mounts a roller 58 which rests upon the upwardly-facing surface of the rearward portion of channel frame 48. The second bracket 56 extends to the opposite end of frame member 48 and is longitudinally offset with respect to the workpiece from first bracket 54. There is rotatably mounted in the end of bracket 56, a second roller 60 which rests upon the upwardly facing surface of the forward portion of frame 48. A shaft support 62 extends upwardly from bracket 54 intermediate the axle 50 and the rearward end of frame 48. Journalled in support 62 is a shaft 64 having a crank 66 fixed to one end adjacent the rear of frame 48 and which terminates in a female universal joint socket member 68. A gear reduction unit 70 is supported from the forwardly extending bracket 56 and receives one end of an input shaft 72 journalled therein. The other end of input shaft 72 has fixed thereon the male member of the universal joint 74 and joint members 74 and 68 are connected in the usual manner. Extending across the frame 48 in front of, and parallel to axle 50 and below gear reduction unit 70, is a drive bar 76. Extending downwardly from unit 70 is an output shaft 78 having a rubber drive wheel 80 mounted thereon. The drive wheel 80 is positioned with respect to the bar 76 such that the outer periphery is in driving engagement therewith.

Figure 2:
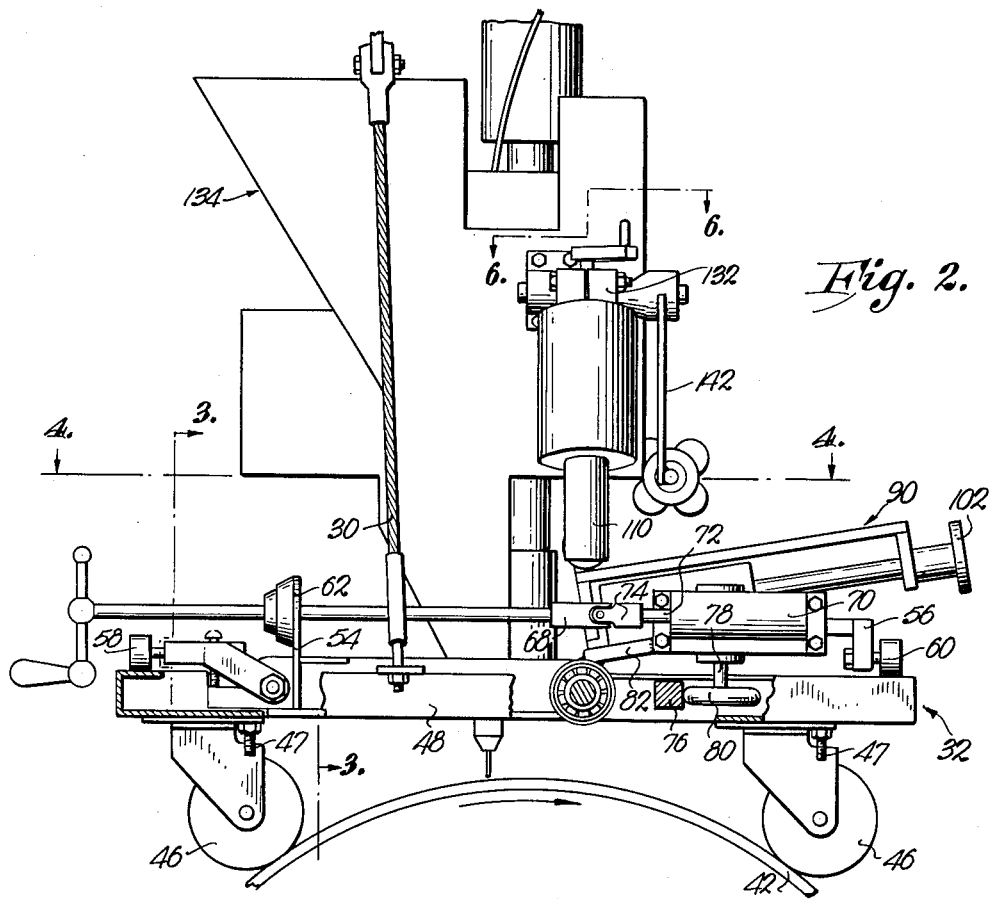
FIG. 2 is an enlarged side view partially in section to show details of construction.
Figure 3:
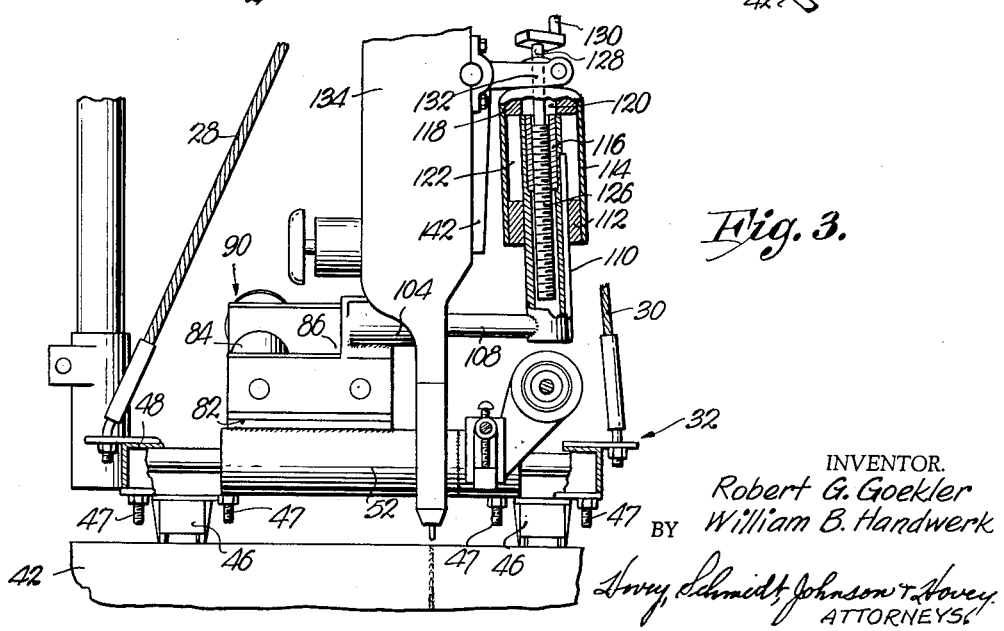
FIG. 3 is a view taken along line 3—3 of FIG. 2.

Lateral adjustment means are provided on carriage 32 including a support frame 82 which can best be seen in FIGS. 2 and 3 as being welded to cylindrical bearing 52 and which is a part of bracket 56.

Figure 4:
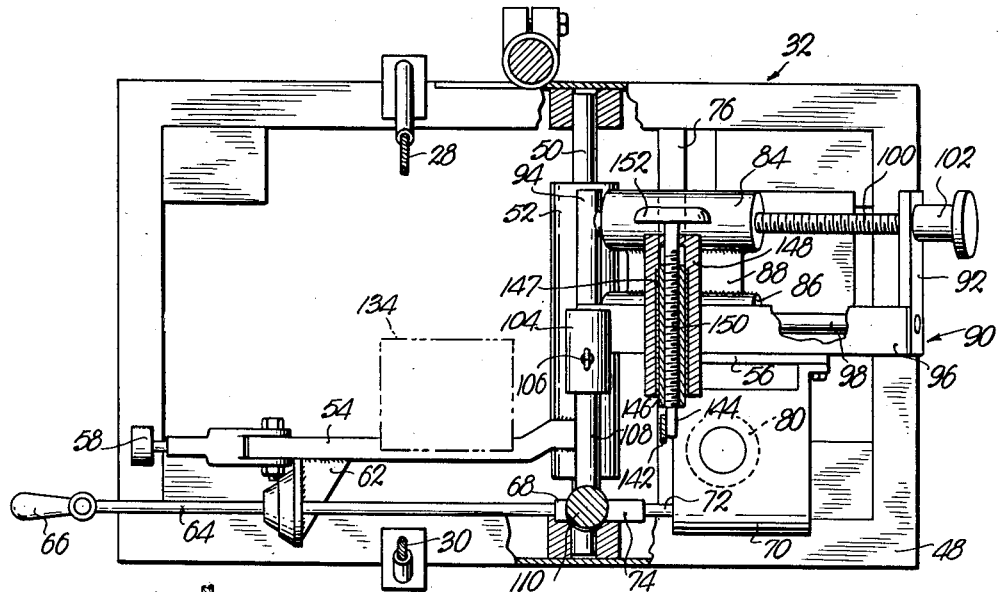
FIG. 4 is a view taken along line 4—4 of FIG. 2.
Figure 5:
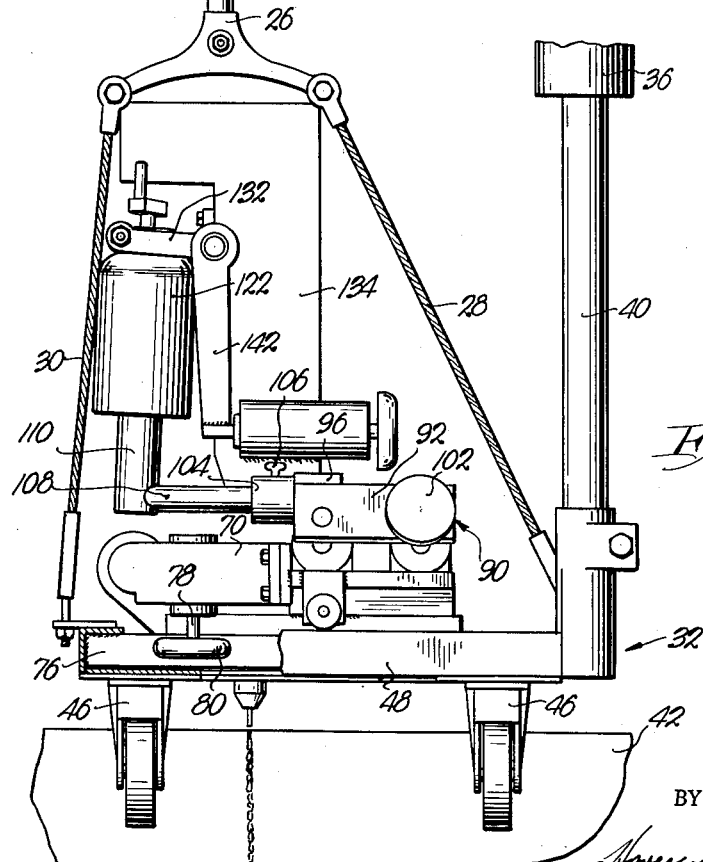
FIG. 5 is a front elevational view with portions broken away to show details of construction.

Referring now to FIG. 4, a pair of cylindrical jack members 84 and 86 are shown interconnected by a cross support 88 welded thereto. Jack member 84 is threaded while member 86 has a smooth bore. It should be noted that support 82 is inclined with respect to bearing 52 upon which it is mounted, and that corerspondingly the jack members 84 and 86 are also inclined at substantially the same angle. An adjustable jack support frame 90 is shown comprising a pair of spaced, parallel flanges 92 and 94 spanned by a cross member 96. A smooth shaft 98 is journalled in the flanges 92 and 94 and extends parallel to, and directly below, cross member 96. Smooth bore cylindrical jack member 86 surrounds shaft 98 and is axially slidable thereon. A threaded shaft 100 is provided parallel to shaft 98 which extends through threaded jack member 84 and is journalled at one end for rotational movement in flange 92 and extends through an opening provided therefor in flange 94 terminating in a turning knob 102.

Vertical adjustment means are provided, including a bearing support cup 104 extending upwardly from flange 92. Cup 104 is provided with a thumb setscrew 106. One end of a connecting shaft 108 is received in cup 104 and is secured in the desired position by setscrew 106. The other end of shaft 108 is welded to the lower end of an upwardly-extending, vertical screw jack shaft 110. Shaft 110 is keyed against relative rotational movement within bushing 112 concentrically press-fitted flush within housing 114. Shaft 110 has a hollow cylindrical interior closed at the end connected to shaft 108 which has press-fitted therein a threaded bronze nut 116 flush with the end of shaft 110.

Fixed to the upper end of the housing 114 and extending therein part way is a support cap 118. Cap 118 has a passage 120 therethrough. The end of the passage 120 which is within housing 114 is of slightly larger diameter than the remainder of the passage 120, forming an enlarged portion 122 into which shaft 110 may fit. A screw shaft 126 is threadably engaged with bronze nut 116 and has a shank portion 128 extending upwardly out of the support shank 118 to which a crank handle 130 is attached. A bracket 132 is provided to connect housing 114 with the welding head and flux hopper 134.

Figure 6:
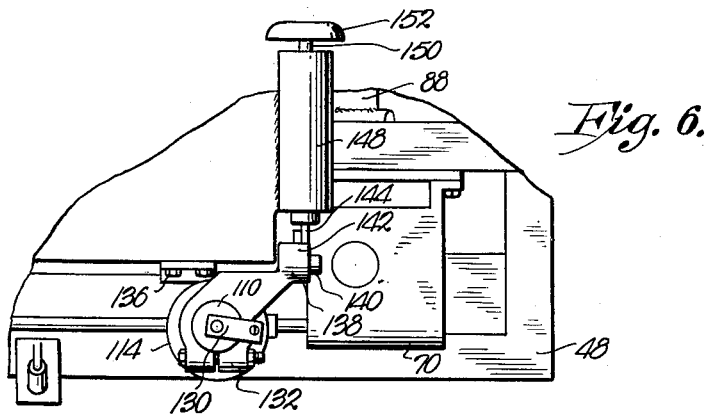
FIG. 6 is a view taken along line 6—6 of FIG. 2.

Longitudinal, arcuate adjusting means are shown in FIG. 6, wherein bracket 132 is shown to include a pair of bearing surfaces 136 and 138 through which a pivot pin 140 is journalled. Integral with bearing surface 138 and extending therefrom, is a link 142. Link 142 is connected at the end remote from bearing surface 138 to a shoulder 144 of screw jack shaft 146. In FIG. 4, shaft 146 is shown slidably mounted within cylindrical support 148. A threaded hollow, cylindrical interior surface 147 is provided with which there is threadably engaged an adjustment shaft 150. Adjustment shaft 150 is journalled in the end of support 148 remote from link 142 and has a turning knob 152 fixed to the end not engaged with jack shaft 146.

In operation, when it is desired to externally weld the seam between two pieces of pipe or other arcuately surfaced objects, hydraulic ram 16 is actuated, forcing the piston 18 to move downwardly and pivot link 20 about its pivot axis on bracket 24. The cable 22 attached to the other end of link 20 moves upwardly and over the pulleys 14 due to the force of gravity on carriage 32. The weight of the carriage mechanism pulls downwardly on cables 28 and 30 and thereby yoke 26, which is attached to the opposite end of cable 22. The lowering action of the carriage will continue until the casters 46 are resting upon the surface of the workpiece, such as pipe 42, and are supporting carriage 32 thereon.

As shown particularly in FIG. 1, the pipe 42 is rotated through the rotating action of roller 44 and because the pipe structure is normally somewhat imperfect in shape, there will be variations in the contour of the external pipe surface which require that the carriage be vertically and transversely floating with respect to the article to be welded while nevertheless remaining connected with the welding rack. By allowing the pipe to completely support the carriage 32 and structure thereon, and by providing the bearing shafts 38 and 40 and the sleeve bearings 34 and 36 into which they are respectively freely slidable, any imperfections in the pipe will cause the carriage to slide transversely on sleeve 34 and vertically on shaft 40.

Once the carriage 32 is lowered into place on the pipe 42 as has been previously described, the welding head and flux hopper indicated generally by the numeral 134, are positioned in the general area of the seam to be welded, but finer adjustments may be required to position the tip of the welding head exactly with respect to the seam to be welded. For this purpose, a plurality of adjustments are required, each of which must accommodate the other while still serving to perform its own function.

The first of the adjusting mechanisms which will be described is the adjustment which permits the welding tip to be positioned longitudinally with respect to the pipe 42. In order to accomplish the longitudinal placement, the operator turns crank 66 and thereby, shaft 64. Shaft 64 rotating in response to the operation of crank 66, drives the universal joint 68, 74, thereby driving input shaft 72 of gear reduction unit 70. Operating in a known manner, gear reduction unit 70 drives output shaft 78 and thereby, drive wheel 80. Drive wheel 80 is made of a material such as rubber and frictionally engages drive bar 76 on carriage 32 to cause driving motion in either direction as selected by the operator, longitudinally of the pipe to be welded. Cylindrical bearing 52 slidable on axle 50, supports all of the above described mechanism which rolls on rollers 58 and 60. The welding head which is indirectly connected to this longitudinal positioning mechanism, as will become apparent as this description proceeds, will be caused to move longitudinally along the pipe in response to the motion imparted by the operator such that the welding tip will assume the position desired.

The second adjustment which may be required is to position the welding tip transversely of the pipe to be welded. In order to accomplish this and still accommodate the longitudinal movement, bearing 52 carries jack members 84 and 86. By turning knob 102 on threaded shaft 100, the threaded shaft 100 can be caused to rotate in either direction desired by the operator, causing axial travel of the threaded shaft relative to jack member 84 into which it is threaded. Shaft 98 is integral with adjustable jack support frame 90 and will move frame 90 transversely with respect to pipe 42 in response to the rotation in either direction of the turning knob 102.

The entire mechanism of the transverse adjustment is supported from bearing 52 which is longitudinally adjustable so that the transverse adjustment may be accomplished while not interfering with the longitudinal movement. As was stated with respect to the longitudinal adjusting means, the transverse adjusting mechanism is also indirectly connected with the welding tip so that the motion imparted by turning knob 102 will affect the welding tip indirectly. Longitudinal motion of the head 134 is accomplished through the transverse mechanism which forms a portion of the connection of the longitudinal adjustment to the welding head 134.

The next adjusting mechanism to be described is that which accomplishes fine vertical adjustment of the welding tip with respect to the piece to be welded and this adjustment is accomplished in the following manner.

A bearing support cup or sleeve 104 is provided on the top of adjustable jack support frame 90 to receive connecting shaft 108. Shaft 108 simply provides a motion transmitting connection between the vertical adjustment mechanism and the transverse adjustment mechanism and is locked against pivoting movement relative to cup 104 by the use of thumb setscrew 106. Turning of the handle 130 will cause shaft 111 to drive shaft 110 axially with respect to housing 114. Housing 114 is fixed to welding head 134 to transfer thereto the forces of the longitudinal, transverse and vertical adjusting mechanisms.

While the bracket 132, which attaches the vertical adjusting mechanism to the welding head, is fixed to transfer vertical force, it is pivotal with respect to transferring force to drive the welding tip in a longitudinal arc slightly to either side of center and this motion is obtained in the following manner. By turning knob 152 in either direction desired, screw jack shaft 146 is rotated within support 148 fixed to head 134, and due to the threaded engagement of shaft 150 slidable within the support 148, will drive shaft 150 axially with respect to shaft 146 forcing the welding head tip to pivot in a small arc to either side of center about pivot pin 140. The last adjustment is particularly required to fill the seam with weld when it is V-shaped in cross section.

Having thus described the invention, what is claimed as new and desired to be secured by Letters Patent is:

1. A welding apparatus for workpieces having irregular surface contours comprising a support; a carriage suspended with the support; means for lowering and raising the carriage into and out of contact with the workpiece; and floating means operably suspending the carriage from the support to permit simultaneous vertical and horizontal movement of the carriage relative to the workpiece when the carriage is resting on the workpiece whereby the carriage is freely movable to compensate for the irregularities in the surface contours of the workpiece.

2. Apparatus as set forth in claim 1, wherein the floating connection includes a horizontal shaft fixedly mounted in the support and extending therefrom transversely to the workpiece; a horizontal sleeve bearing axially slidable on the horizontal shaft; a vertical sleeve bearing fixed to the horizontal sleeve bearing; and a vertical shaft fixed to the carriage and axially slidable within the vertical sleeve bearing, whereby the carriage may float vertically and simultaneously horizontally transversely with respect to the workpiece.

3. A welding apparatus comprising a carriage; a welding head supported on the carriage; and first adjustment means mounted on the carriage and connected to the welding head to adjust the position of the welding head in a first direction relative to the carriage, said first adjustment means including a manually drivable shaft and a drive wheel connected to be rotatable therewith and movably supported on the carriage, a welding head connected to said shaft and the wheel, and a surface on the carriage positioned to be in frictional driving engagement with the drive wheel and parallel to the workpiece whereby manual driving of the shaft will cause frictional drive of the wheel against the surface moving the shaft and wheel and thereby the connected welding head.

4. A welding apparatus comprising a carriage; a welding head supported on the carriage; and first adjustment means mounted on the carriage and connected to the welding head to adjust the position of the welding head in a first direction relative to the carriage, said first adjustment means including an axle on the carriage parallel to the workpiece, a sleeve slidably mounted on the axle for movement in a direction axial thereto, a pair of brackets fixedly mounted on the sleeve, each bracket having a roller supported on the carriage, a shaft rotatably mounted on the brackets, a gear reduction unit fixedly secured to the brackets, a manual crank on one end of the shaft and the gear reduction unit at the opposite end thereof, an output shaft rotatably journalled in the gear reduction unit and a drive wheel mounted on the shaft to rotate therewith, and a bar extending across the carriage parallel to the workpiece, the drive wheel and the bar being positioned in frictional interengagement whereby cranking of the manual crank drives the drive wheel frictionally against the bar causing the sleeve and brackets and elements supported thereon to move longitudinally relative to the workpiece.

5. A welding apparatus comprising a carriage; a welding head supported on the carriage; first adjustment means mounted on the carriage to adjustably position the head in a first direction relative to the carriage; and second adjustment means fixed to the first adjustment means and connected to the welding head, the second adjustment means transferring the positioning motion of the first adjustment means to the welding head and adjustably positioning the welding head in a second direction relative to the carriage.

6. A welding apparatus comprising a carriage; a welding head supported on the carriage; first adjustment means mounted on the carriage to adjustably position the head in a first direction relative to the carriage; second adjustment means fixed to the first adjustment means to adjustably position the head in a second direction relative to the carriage; and third adjustment means fixed to the second adjustment means transferring the positioning motion of the first and second adjustment means to the welding head and adjustably vertically positioning the welding head relative to the carriage.

7. A welding apparatus comprising a carriage; a welding head supported on the carriage; first adjustment means mounted on the carriage to adjustably position the head in a first direction relative to the carriage; second adjustment means fixed to the first adjustment means to adjustably position the head in a second direction relative to the carriage; third adjustment means fixed to the second adjustment means and to the welding head to adjustably position the head in a vertical direction relative to the carriage and to transfer to the welding head adjusting motion of the first and second adjusting means; and fourth adjustment means fixed to the welding head and pivoted to the third adjustment means to finely adjust the welding head in the second direction.

8. A welding apparatus for workpieces having irregular surface contours comprising a support; a carriage connected with the support; means for lowering and raising the carriage into and out of supported contact with respect to the workpiece; means providing a floating interconnection between the carriage and the support when the carriage is in contact with the workpiece to compensate for irregularities in the surface contours of the workpiece; and first adjustment means mounted on the carriage and supporting a welding head to permit selective adjustment of the position of the head in a first direction relative to the carriage.

9. Apparatus as set forth in claim 8, wherein is provided a second adjustment means mounted on the first adjustment means and supporting the welding head to permit selective adjustment of the position of the head in a first direction by transferring the adjustment of the first adjustment means to the head and to adjustably position the head in a second direction.

10. Apparatus as set forth in claim 9, wherein is provided a third adjustment means mounted on the second adjustment means and supporting the welding head to permit selective adjustment of the position of the head in a first and second direction by transferring the adjustment of the first and second adjustment means to the head and to adjustably position the head in a vertical direction.

11. Apparatus as set forth in claim 10, wherein the third adjustment means are pivoted to the head in further combination with fourth adjustment means fixed to the head and pivoted with respect to the third adjustment means to permit fine adjustment of the welding head in the second direction.

12. A welding apparatus comprising a carriage; a welding head; a frame carrying the welding head and movably mounted on the carriage; and means mounted on the carriage to adjust the disposition of the welding head and including a threaded cylindrical jack member fixed to the carriage and a threaded shaft journalled in the frame and threadably engaged with the jack member whereby rotation of the shaft moves the frame relative to the jack member thereby positioning the welding head along the weld path.

13. A welding apparatus comprising a carriage; a welding head supported on the carriage; and vertical adjustment means mounted on the carriage and connected to the welding head to adjust the position of the welding head vertically relative to the carriage said vertical adjustment means including a vertical screw jack shaft having a hollow threaded cylindrical interior, a connecting shaft interconnecting the carriage and the vertical screw jack shaft and a threaded shaft mounted on the welding head and threadably engaged in the jack shaft interior whereby rotation of the threaded shaft will axially move the jack shaft and threaded shaft relative to each other thereby vertically positioning the welding head relative to the carriage.

14. A welding apparatus comprising a carriage; a welding head pivotally supported on the carriage; and adjustment means mounted on the welding head and connected to the pivotal support to adjust the position of the welding head arcuately relative to the carriage, said adjustment means including a support mounted on the welding head and a screw jack shaft threadably engaged in a hollow threaded shaft slidable within the support, whereby rotation of the screw jack shaft moves the hollow shaft to slide axially within the support and pivot the welding head about its pivot mounting to arcuately position the welding head relative to the carriage.

References Cited in the file of this patent

UNITED STATES PATENTS

| | | |
|---|---|---|
| 1,638,024 | Woodrow | Aug. 9, 1927 |
| 1,991,128 | Tripp | Feb. 12, 1935 |
| 2,016,043 | Lincoln | Oct. 1, 1935 |
| 2,436,387 | Harter et al. | Feb. 24, 1948 |